(12) United States Patent
Ohata et al.

(10) Patent No.: US 8,076,887 B2
(45) Date of Patent: Dec. 13, 2011

(54) WIPER CONTROLLER

(75) Inventors: Tomoyuki Ohata, Tokyo (JP); Shigeo Watanabe, Tokyo (JP)

(73) Assignee: Niles Co., Ltd, Tokyo (JP)

( * ) Notice: Subject to any disclaimer, the term of this patent is extended or adjusted under 35 U.S.C. 154(b) by 625 days.

(21) Appl. No.: 12/285,039

(22) Filed: Sep. 29, 2008

(65) Prior Publication Data

US 2009/0089955 A1 Apr. 9, 2009

(30) Foreign Application Priority Data

Oct. 9, 2007 (JP) ................................. 2007-263202

(51) Int. Cl.
*B60S 1/08* (2006.01)
(52) U.S. Cl. .......................... 318/444; 318/484; 388/921
(58) Field of Classification Search .................. 318/443, 318/444, 445, 452, 484; 388/921; 15/250.12, 15/250.13, 250.27
See application file for complete search history.

(56) References Cited

U.S. PATENT DOCUMENTS

| | | | | |
|---|---|---|---|---|
| 4,329,631 A | * | 5/1982 | Betsch et al. | 318/466 |
| 4,885,512 A | * | 12/1989 | Gille et al. | 318/444 |
| 5,049,794 A | * | 9/1991 | Okada et al. | 318/443 |
| 5,525,879 A | * | 6/1996 | Wainwright | 318/443 |
| 7,332,830 B2 | * | 2/2008 | Yamazaki et al. | 307/10.1 |
| 2002/0008486 A1 | * | 1/2002 | Yabe | 318/443 |

FOREIGN PATENT DOCUMENTS

| | | |
|---|---|---|
| JP | 4-349053 | 12/1992 |
| JP | 61-37560 | 5/1994 |

* cited by examiner

*Primary Examiner* — Bentsu Ro
(74) *Attorney, Agent, or Firm* — Radar, Fishman & Grauer PLLC

(57) ABSTRACT

A wiper controller which detects the raindrops adhered onto the windshield glass G of the vehicle to control the wiper based on the detected result is provided with a wiped water measurement unit for calculating an amount of water wiped by the wiper, a wiper operation time counter for counting the actual wiper operation time based on the ON/OFF signal of the wiper motor for driving the wiper, a delay time calculation unit which obtains the wiper operation delay time by comparing the actual wiper operation time with the reference wiper operation time, and an operation change determination unit for determining with respect to the need for changing the wiper operation based on the wiper operation delay time and the amount of water wiped by the wiper. The change in the rainfall state is derived from the wiper operation delay time and the amount of water wiped by the wiper to appropriately control the wiper in response to the change in the rainfall state.

13 Claims, 13 Drawing Sheets

Fig.6

| WIPER OPERATION DELAY LEVEL | DELAY TIME |
|---|---|
| 9 | 144ms~ |
| 8 | 128ms~ |
| 7 | 112ms~ |
| 6 | 96ms~ |
| 5 | 80ms~ |
| 4 | 64ms~ |
| 3 | 48ms~ |
| 2 | 32ms~ |
| 1 | 16ms~ |
| 0 | 0ms~ |

Fig.7

| WIPER OPERATION DELAY LEVEL | WIPER STOP CORRECTION COEFFICIENT |
|---|---|
| 8 and Above | 3 |
| 6~7 | 2 |
| 4~5 | 1 |
| 0~3 | 0 |

Fig.9

| CHANGE AMOUNT OF EVALUATED VALUE UPON PASSAGE OF WIPER | WIPED WATER LEVEL |
|---|---|
| 688~719 | 22 |
| 656~687 | 21 |
| 624~656 | 20 |
| 592~623 | 19 |
| 560~591 | 18 |
| 528~559 | 17 |
| 496~527 | 16 |
| 464~495 | 15 |
| 432~463 | 14 |
| 400~431 | 13 |
| 368~399 | 12 |
| 336~367 | 11 |
| 304~335 | 10 |
| 272~303 | 9 |
| 240~271 | 8 |
| 208~239 | 7 |
| 176~207 | 6 |
| 144~175 | 5 |
| 112~143 | 4 |
| 80~111 | 3 |
| 48~79 | 2 |
| 16~47 | 1 |
| 0~15 | 0 |

Fig.10

| | WIPER STOP CORRECTION COEFFICIENT | | | |
|---|---|---|---|---|
| | 0 | 1 | 2 | 3 |
| WIPED WATER LEVEL | < 2 | < 4 | < 8 | < 16 |

WIPER CONTROLLER

BACKGROUND OF THE INVENTION

1. Field of the Invention

The present invention relates to a vehicle wiper controller for controlling a wiper by accurately detecting a rainfall state.

2. Description of the Related Art

A raindrop sensor formed using the optical technique is known as being employed in a vehicle wiper controller for controlling a wiper.

In the generally employed raindrop sensor using the optical technique, light rays irradiated from a light-emitting element reflect on a detection surface, and the light-receiving element receives the reflecting light to detect raindrops. Specifically, when water is adhered onto the detection surface, the light reflecting condition on the detection surface changes, and accordingly, the amount of light received by the light-receiving element also changes. The raindrops adhered onto the detection surface may be detected based on the change in the amount of light received by the light-receiving element.

Various methods for detecting the raindrops adhered onto the detection surface based on the change in the amount of received light have been proposed. For example, the method for detecting the raindrops in comparison with the reference value is disclosed in Japanese Unexamined Patent Application Publication No. 61-37560, and the method for detecting the raindrops by accumulating outputs of the light-receiving element is disclosed in Japanese Patent Application Laid-Open No. 4-349053.

Because of a mount location and a small raindrop detection area, the raindrop sensor of the aforementioned type is unlikely to provide the stable detection result.

The resultant output values of the raindrop sensor may differ even in the similar rainfall state. The direct reflection of the detection result of the raindrop sensor in the wiper operation control may fail to appropriately control the wiper. The detection result of the raindrop sensor is required to be monitored for a predetermined period to determine adequacy of the detection results for the purpose of controlling the wiper operation. This may prolong the time for feedback of the detection results to the wiper control.

In the aforementioned case, it is difficult to detect sharp change in the rainfall state so as to be reflected in the wiper control. When the vehicle goes into the tunnel while operating the wiper at high speeds under the heavy rain, the operation for switching the operation speed of the wiper from high to low, or stopping the wiper operation cannot be immediately performed. The aforementioned wiper operation will make the driver feel unpleasant.

SUMMARY OF THE PRESENT INVENTION

It is an object of the present invention to provide a wiper controller for detecting a change in a rainfall state accurately so as to reflect the detected change in the wiper operation control.

The present invention provides a wiper controller which detects raindrops adhered onto a windshield glass of a vehicle to control a wiper based on a detection result. The wiper controller includes a wiper operation time counter for counting an actual operation time of the wiper based on an ON/OFF signal of a wiper motor for driving the wiper, a delay time calculation unit for obtaining a delay time of the wiper by a comparison between a reference wiper operation time and the actual operation time, and an operation change determination unit for determining with respect to a need for changing the wiper operation based on the delay time of the wiper.

In the present invention, a wiper operation delay time is calculated by comparing an actual wiper operation time obtained based on an ON/OFF signal of a wiper motor for driving the wiper with a reference wiper operation time. Based on the calculated operation delay time, the determination with respect to the need for changing the wiper operation is made.

When the windshield glass is sufficiently wet with water such as raindrops, the wiping speed of the wiper is likely to be accelerated by the water serving as the lubricant. Meanwhile, when the amount of water on the windshield decreases, the friction between the wiper and the windshield glass is increased to decelerate the wiping speed. When the amount of water adhered onto the windshield glass decreases as the rainfall state changes, the actual wiper operation time is prolonged in accordance with the reduced amount. As a result, the difference between the actual wiper operation time and the reference operation time becomes large, thus prolonging the wiper operation delay time.

Based on the wiper operation delay time, the change in the amount of water adhered onto the windshield glass owing to the change in the rainfall state is obtained to allow a determination with respect to the need for changing the wiper operation, for example, stopping, or decelerating the wiper operation. This makes it possible to control the wiper operation accurately in response to the change in the rainfall state.

Based on the wiper operation delay time calculated for a short period, the wiper operation may be immediately adjusted, thus preventing the driver from feeling unpleasant with the wiper operation.

BRIEF DESCRIPTION OF THE DRAWINGS

FIG. 6 is an explanatory view showing a delay time map;

FIG. 7 is an explanatory view showing a correction coefficient map;

FIG. 9 is an explanatory view showing a wiped water map;

FIG. 10 is an explanatory view of a determination map;

DETAILED DESCRIPTION OF THE PREFERRED EMBODIMENT

An embodiment of the present invention will be described hereinafter.

Figure 1:
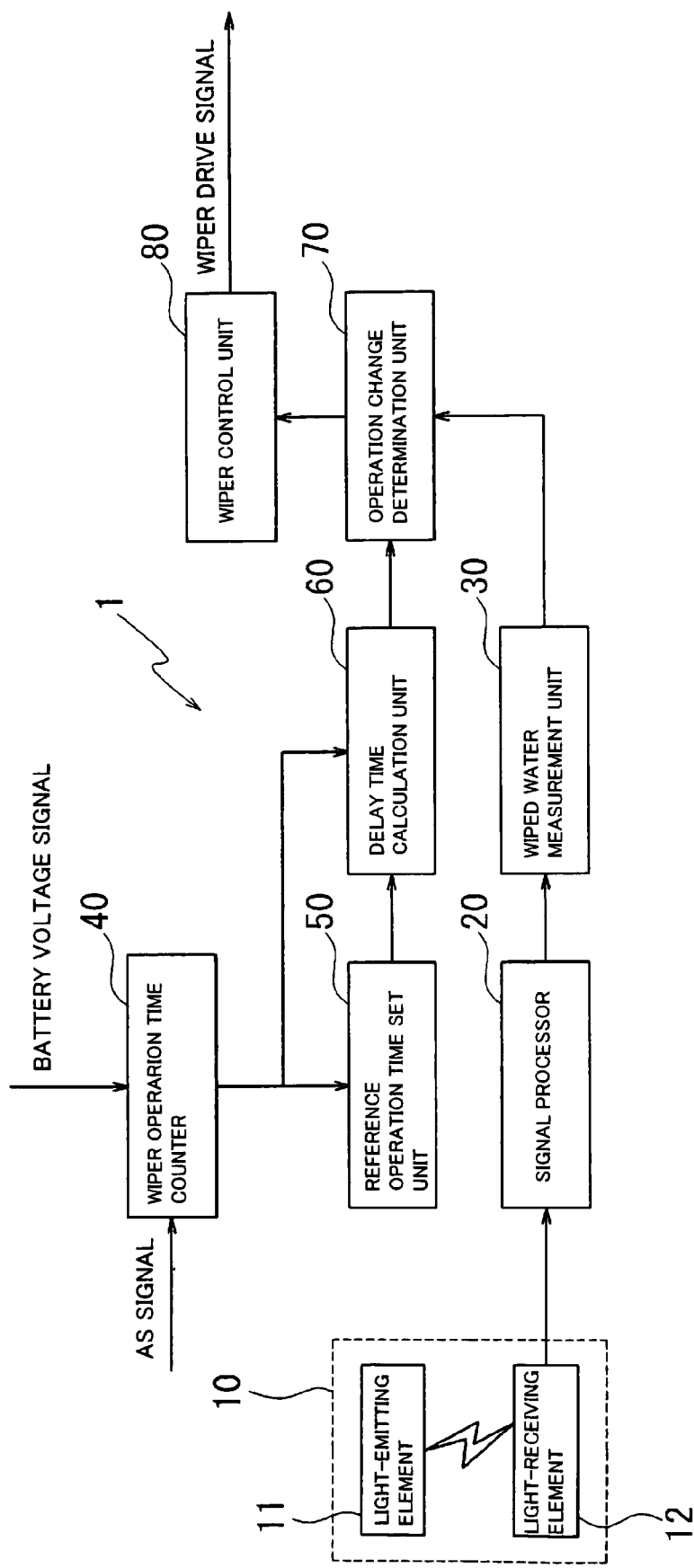
FIG. 1 is a block diagram of a wiper controller according to an embodiment of the present invention.

FIG. 1 is a block diagram schematically showing a structure of a wiper controller according to the embodiment.

Figure 2:
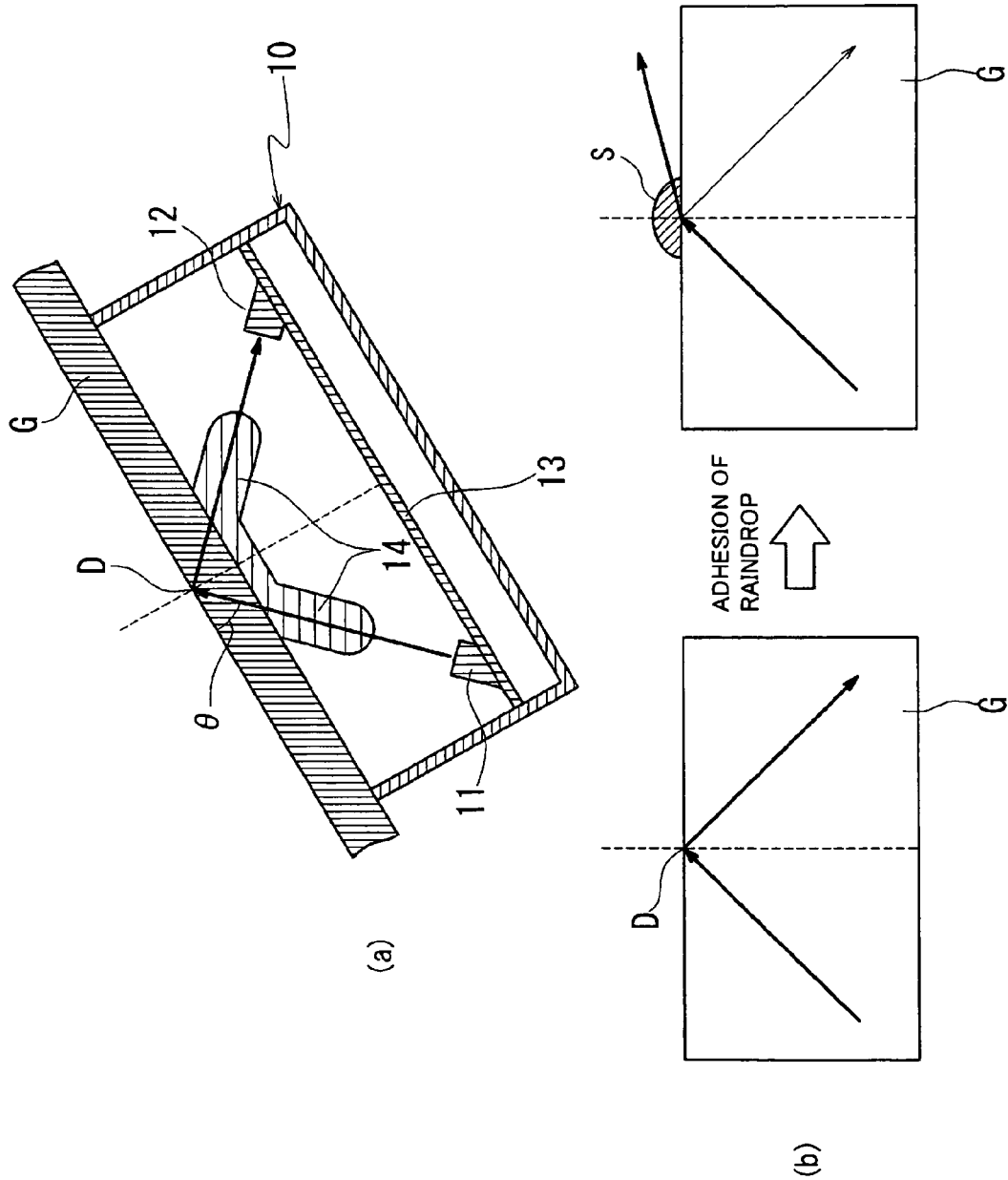
FIG. 2 is an explanatory view showing a structure of a sensor in the wiper controller according to the embodiment.

FIG. 2 shows a structure of a sensor in the wiper controller, wherein FIG. 2A is a sectional view of a windshield glass to which the sensor is attached, and FIG. 2B is an explanatory view representing detection of raindrops adhered onto the windshield glass.

A wiper controller 1 according to the embodiment includes a sensor 10 for detecting raindrops, a signal processor 20, a wiped water measurement unit 30, a wiper operation time counter 40, a reference operation time set unit 50, a delay time calculation unit 60, an operation change determination unit 70, and a wiper control unit 80.

The sensor 10 formed of a light-emitting element 11 as an LED and a light-receiving element 12 is disposed on a surface of a windshield glass G in a vehicle interior within an area where the wiper is operated on the surface of the windshield glass G.

Referring to FIG. 2A, the light-emitting element 11 is disposed on a control substrate 13 while being tilted at a predetermined angle such that the incident angle of the light irradiated to the windshield glass G becomes a predetermined angle of θ. The light-receiving element 12 is disposed on the control substrate 13 while being tilted at a predetermined angle in alignment with the optical path of the reflecting light from the windshield glass G so as to be received.

Lenses 14 are interposed between the windshield glass G, and the light-emitting element 11 and the light-receiving element 12, respectively. The lens 14 guides the light irradiated from the light-emitting element 11 to the windshield glass G to form a detection surface D with a predetermined area, and further guides the light reflecting on the detection surface D to the light-receiving element 12.

The light-emitting element 11 receives an input of a pulse signal from a light-emitting control unit (not shown) so as to irradiate the light to the detection surface D at a predetermined interval defined by the pulse signal. The light reflecting on the detection surface D is focused by the lens 14, and received by the light-receiving element 12 for generating a light-receiving signal (electric signal) at a level corresponding to the amount of light received.

Referring to FIG. 2B, when raindrops S are adhered onto the detection surface D, the light irradiated from the light-emitting element 11 is partially diffused by the raindrops S. So the amount of light received by the light-receiving element 12 decreases in accordance with the amount of the raindrops S adhered onto the detection surface D. The light-receiving element 12 generates the output at the level which varies with the amount of the raindrops S adhered onto the detection surface D. At this time, the more the amount of the raindrops adhered onto the detection surface D is increased, the smaller the output value becomes. Accordingly, the amount of the raindrops adhered onto the detection surface D may be detected based on the output value of the light-receiving element 12.

The signal processor 20 converts the output value of the light-receiving element 12 into the voltage value, and performs amplification and digital conversion of the converted voltage value.

The wiped water measurement unit 30 measures the amount of raindrops (water) wiped by the wiper based on the digitally converted output value of the light-receiving element 12.

The wiper operation time counter 40 counts the time (actual wiper operation time) for which the wiper is operated based on an A/S signal input from a wiper motor (not shown) for driving the wiper, which represents the ON/OFF state of the wiper motor.

The reference operation time set unit 50 sets a reference value (reference operation time) based on which a determination of "fast/slow" is made in the delay time calculation unit 60 (described later) with respect to the actual wiper operation time (hereinafter referred to as the wiper operation time) counted by the wiper operation time counter 40.

The delay time calculation unit 60 calculates a wiper operation delay time by comparing the reference operation time set by the reference operation time set unit 50 with the wiper operation time counted by the wiper operation time counter 40.

The operation change determination unit 70 determines with respect to the need for changing the wiper operation based on the amount of water wiped by the wiper and the wiper operation delay time.

The wiper control unit 80 operates the wiper under the operation mode defined by a wiper switch (not shown), and changes the wiper operation based on the determination result of the operation change determination unit 70. The wiper operation may be controlled by outputting the drive signal to the wiper motor (not shown) so as to be operated based on the drive signal.

An operation of the wiper controller 1 will be described hereinafter.

Figure 3:
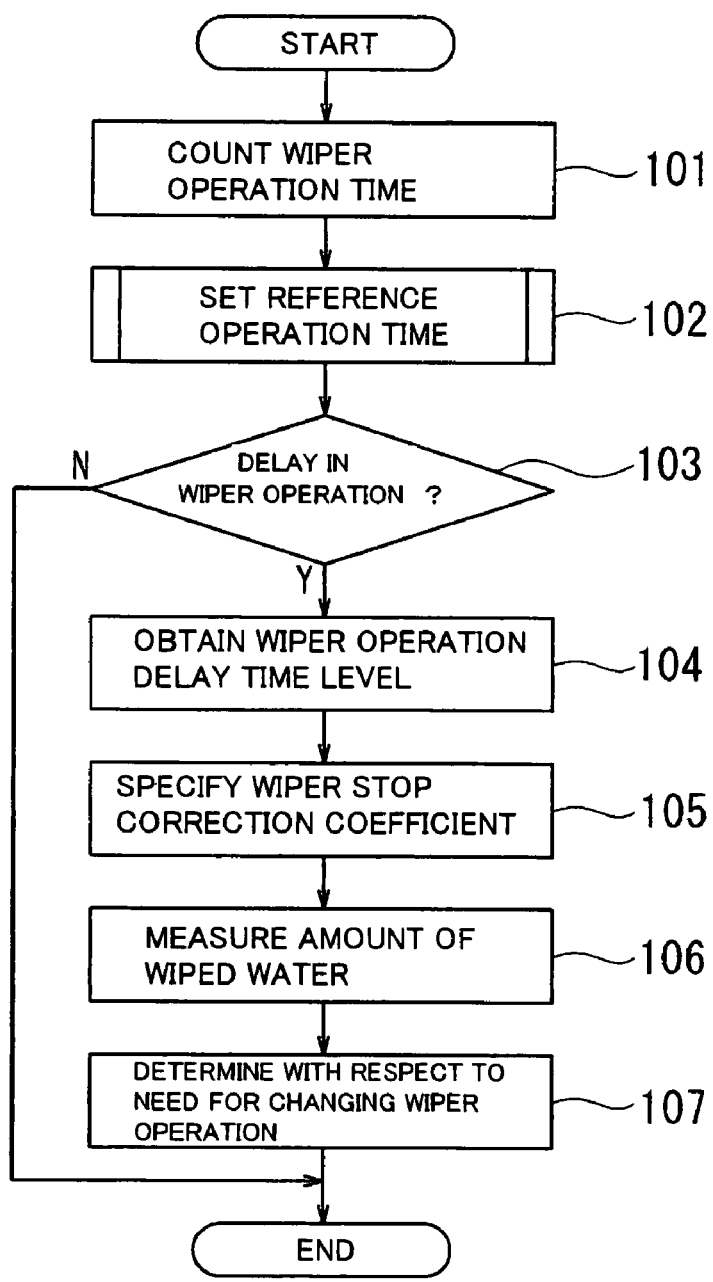
FIG. 3 is a flowchart showing a process performed in the wiper controller according to the embodiment.

FIG. 3 is a flowchart showing a process performed in the wiper controller.

In step 101, the wiper operation time counter 40 counts the wiper operation time based on the A/S signal input from the wiper motor for driving the wiper.

The wiper operation time counter 40 constantly receives the input of the A/S signal from the wiper motor for driving the wiper, which represents the ON/OFF state of the wiper motor.

The wiper operation time counter 40 determines the ON/OFF state of the wiper motor based on the A/S signal at a predetermined time interval (for example, at the interval of 16 ms) for counting the wiper operation time based on the determination results.

Figure 4:
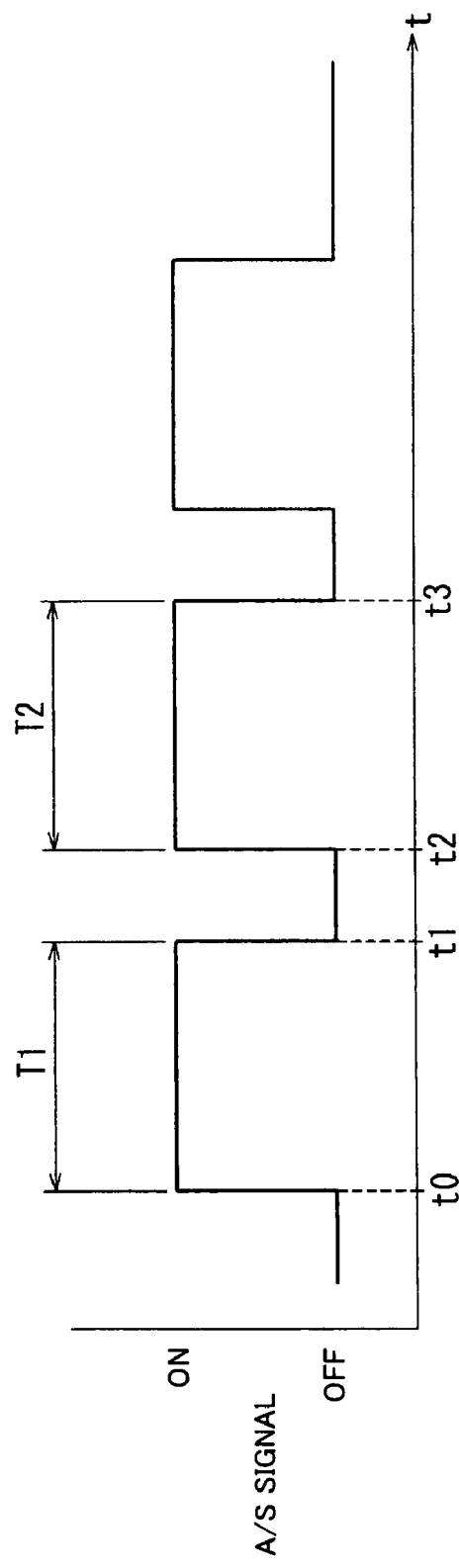
FIG. 4 is an explanatory view showing a waveform of an A/S signal.

FIG. 4 is an explanatory view showing the waveform of the A/S signal input to the wiper operation time counter 40.

The waveform in FIG. 4 represents the change with time in the A/S signal input to the wiper operation time counter 40. Referring to the drawing, while the A/S signal is in ON state, the wiper motor is operated. Meanwhile, while the A/S signal is in OFF state, the wiper motor is stopped.

Upon switching of the A/S signal from ON to OFF, the wiper operation time counter 40 counts the time while the A/S signal has been kept ON, and sets the counted time to the wiper operation time.

For example, referring to FIG. 4, the A/S signal is switched from ON to OFF at a time point t1. A time period T1 for which the A/S signal has been kept ON from the time point t0 to t1 is set to the wiper operation time. Then the operation time information which indicates the obtained wiper operation time is generated and output to the reference operation time set unit 50 and the delay time calculation unit 60.

The wiper operation time counter 40 counts the duration of the ON state of the A/S signal every time when the A/S signal is switched to OFF for generating the operation time information.

The time period T2 from the time point t2 to t3 is set as the wiper operation time defined by the operation time information to be generated subsequently.

In step 102, the reference operation time set unit 50 sets the reference operation time, based on which the determination with respect to the delay in the wiper operation time is made in the delay time calculation unit 60 to be described later.

Figure 5:
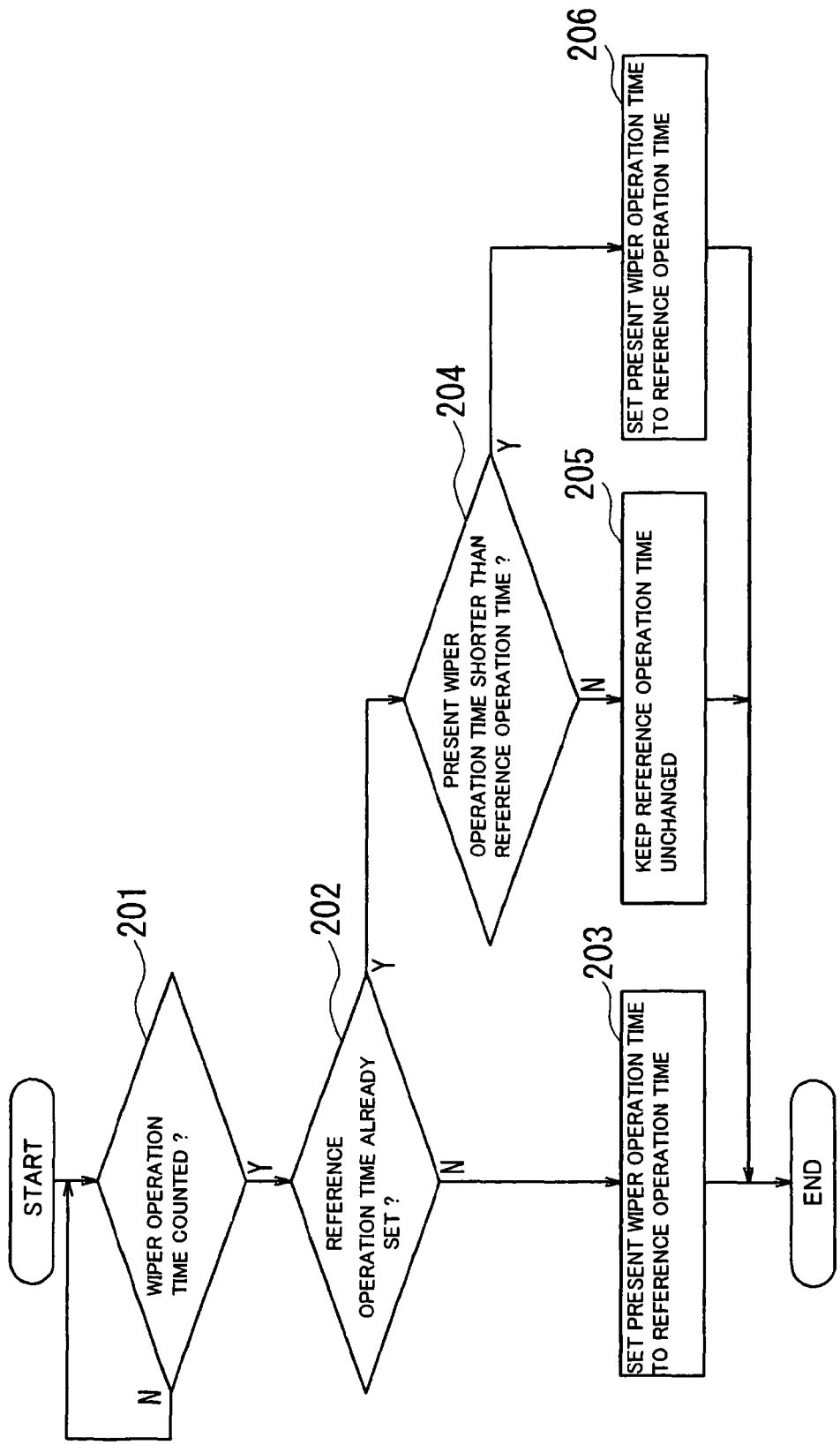
FIG. 5 is a flowchart showing a process performed in a reference operation time set unit in detail.

FIG. 5 is a flowchart of a process executed in the reference operation time set unit 50.

The operation for setting the reference operation time for the wiper will be described referring to FIG. 5.

In step 201, the reference operation time set unit 50 determines whether or not the wiper operation time has been counted based on the input of the operation time information from the wiper operation time counter 40.

When it is determined that the wiper operation time has been counted in step 201, the process proceeds to step 202 where it is further determined whether or not the reference operation time has been already set. The above confirmation is made for the purpose of determining whether or not the wiper is driven for the first time from the stopped state.

When it is determined that the reference operation time has not been set in step 202, that is, when the wiper is first driven from the stopped state, the process proceeds to step 203 where the wiper operation time (the present wiper operation time) defined by the input operation time information is set as the reference operation time.

In step 202, when the reference operation time has been already set, the process proceeds to step 204 where the present wiper operation time is compared with the reference operation time so as to confirm whether the present wiper operation time is shorter than the reference operation time which has been already set. The confirmation is made to determine whether or not the preliminarily set reference operation time is a minimum value.

In step 204, when the present wiper operation time is not shorter than the reference operation time, the process proceeds to step 205 where the reference operation time is kept unchanged.

In step 204, when the present wiper operation time is shorter than the reference operation time, the process proceeds to step 206 where the present wiper operation time is newly set to the reference operation time.

In this way, the reference operation time set unit 50 is structured to immediately detect the delay in the wiper operation time so as to constantly keep the reference operation time minimized.

The process performed in the wiper controller shown in FIG. 3 will further be described.

In step 103, the delay time calculation unit 60 confirms whether or not the delay occurs in the wiper operation.

When the delay occurs in the wiper operation, the wiper operation time is prolonged. So the delay time calculation unit 60 determines that the delay has occurred in the wiper operation when the wiper operation time is longer than the reference operation time.

In step 103, when it is confirmed that the delay has occurred in the wiper operation, the process proceeds to step 104 where the delay time calculation unit 60 sets the time difference obtained by subtracting the reference operation time from the wiper operation time to the wiper operation delay time. Based on the wiper operation delay time, the degree (level) of the wiper operation delay time is specified by referring to the delay time map stored in a memory unit (not shown).

FIG. 6 is an explanatory view of the delay time map.

The delay time map specifies the relationship between the wiper operation delay time level (wiper delay level) and the wiper operation delay time. The wiper delay level may be specified based on the delay time. For example, when the delay time is 20 ms, the wiper delay level is set to "1", and when the delay time is 90 ms, the wiper delay level is set to "5".

When the wiper delay level is specified, the delay time calculation unit 60 refers to a correction coefficient map stored in the memory unit (not shown) to specify the coefficient (wiper stop correction coefficient) for determining with respect to the need for stopping the wiper operation in step 105.

FIG. 7 is an explanatory view of the correction coefficient map.

The correction coefficient map defines the relationship between the wiper delay level and the wiper stop correction coefficient. The wiper stop correction coefficient may be specified based on the wiper delay level. For example, when the wiper delay level is "5", the wiper stop correction coefficient is specified to "1".

In the embodiment, the wiper stop correction coefficient set to "3" represents that the windshield glass G is dried. The coefficient set to "2" represents that the windshield glass G is in substantially the dry state. The coefficient set to "1" represents that the windshield glass G is in substantially the wet state. The coefficient set to "0" represents that the windshield glass G is wet.

When the delay time from the reference operation time is equal to or longer than 64 ms (when the wiper delay level becomes "4" or higher), it is determined that the delay has occurred in the wiping speed such that the wiper stop correction coefficient is set. Then the operation change determination unit 70 determines with respect to the need for stopping the wiper operation based on the wiper stop correction coefficient.

Referring to the correction coefficient map, when the delay time level is lower than "3", it is structured to set the wiper stop correction coefficient to "0". The above operation has been performed to prevent the error in the wiper operation time based on the A/S signal from influencing the determination performed in the operation change determination unit 70.

In step 106, the wiped water measurement unit 30 measures the amount of water wiped by the wiper based on the output value of the light-receiving element 12 upon passage of the wiper over the detection surface D.

Figure 8:
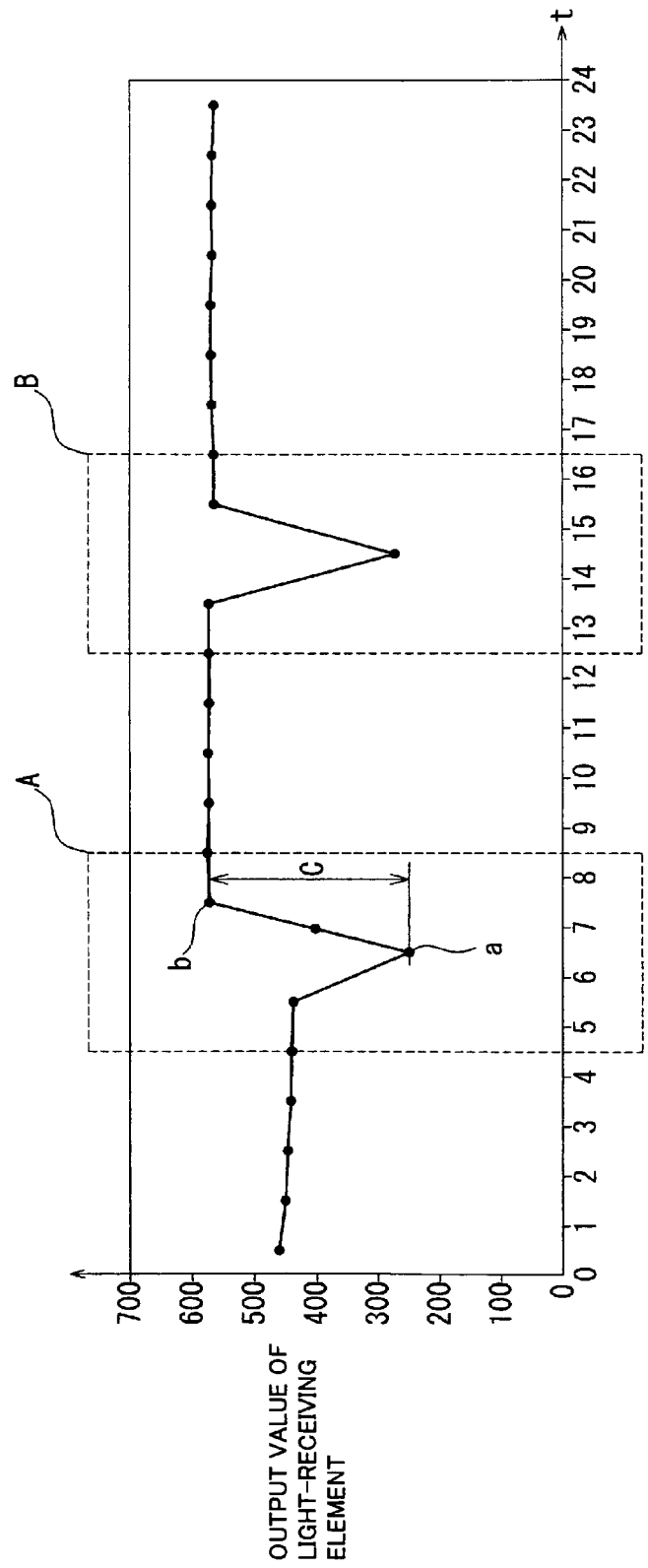
FIG. 8 is an explanatory view showing an output of a light-receiving element after digital conversion.

FIG. 8 shows the waveform which represents the change in the output of the light-receiving element 12 with time after the digital conversion.

Upon passage of the wiper on the detection surface D set on the windshield glass G, the raindrops adhered onto the detection surface D is wiped by the wiper to largely change the light reflection condition on the detection surface D. So the output value of the light-receiving element 12 largely varies upon passage of the wiper.

As shown in FIG. 8, each change in the output value of the light-receiving element 12 enclosed by the dotted lines A and B represents the passage of the wiper. As the wiper reciprocates the wiping region on the windshield glass G, the change in the output value of the area enclosed by the dotted line A is caused by the forward movement of the wiper. The change in the output value of the area enclosed by the dotted line B is caused by the return movement of the wiper.

The wiper moves while collecting the raindrops adhered onto the surface of the windshield glass G. Then the output value of the light-receiving element 12 upon passage of the wiper on the detection surface D decreases owing to the collected water, and increases sharply at a time point when the operation for wiping the raindrops performed by the wiper is completed accompanied with its passage. The output value at a point a is obtained when the collected water is located on the detection surface D. The output value at a point b is obtained upon completion of the wiping operation.

The difference between the output values at the points a and b (designated by code C) is substantially equivalent to the amount of water wiped by the wiper. As a result, the amount of water wiped by the wiper may be derived from the amount of the raindrops based on the output value at the point a.

The wiped water measurement unit 30 sets the output value (point a shown in the drawing) which is the smallest among those of the light-receiving element 12 upon forward movement of the wiper to the evaluated value. Thus, the evaluated value is compared with the one evaluated upon the previous forward movement of the wiper.

When the present evaluated value is larger than the previous one (amount of water wiped by the wiper is reduced), the previous evaluated value is subtracted from the present evaluated value to obtain the difference, based on which the amount of water wiped by the wiper is specified by referring to the wiped water map stored in the memory unit (not shown).

FIG. 9 is an explanatory view of the wiped water map.

The wiped water map defines the relationship between the amount of change in the evaluated value upon passage of the wiper and the amount of water wiped by the wiper. The amount (level) of water wiped by the wiper may be specified based on the amount of change in the evaluated value upon passage of the wiper. For example, when the amount of change is 100, the wiped water level is specified to "3". Meanwhile when the amount of change is 300, the level is specified to "9".

The wiped water measurement unit 30 generates the wiped water information indicating the wiped water level, based on which the level of the water wiped by the wiper may be specified.

In step 107, the operation change determination unit 70 determines with respect to the need for stopping the wiper operation based on the wiper operation delay time and the amount of water wiped by the wiper.

More specifically, the determination is made with respect to the need for stopping the wiper operation by referring to the determination map stored in the memory unit (not shown) based on the wiped water information generated by the wiped water measurement unit 30, and the wiper stop correction coefficient defined by the delay time calculation unit 60.

FIG. 10 is an explanatory view of the determination map.

The determination map defines the relationship between the amount of water wiped by the wiper (wiped water level) and the wiper stop correction coefficient upon determination with respect to the need for stopping the wiper operation.

For example, in the case where the wiper stop correction coefficient is 0 (no delay time), it is determined to stop the wiper operation when the wiped water level is lower than 2. In the case where the wiper stop correction coefficient is 1 (short delay time), it is determined to stop the wiper operation when the wiped water level is lower than 4. In the case where the wiper stop correction coefficient is 3 (long delay time), it is determined to stop the wiper operation when the wiped water level is lower than 16.

As the wiper operation delay time gets longer owing to reduced amount of water adhered onto the windshield glass G, the determination to stop the wiper operation may be easily made.

The wiper control unit 80 stops outputting the drive signal to the wiper motor (not shown) for driving the wiper upon determination to stop the wiper operation made by the operation change determination unit 70, thus stopping the wiper operation.

The determination with respect to the need for changing (stopping) the wiper operation may be made based only on the wiper operation delay time by referring to the map where the control condition is preliminarily set. For example, when the wiper delay level indicating the degree of the wiper operation delay time is equal to or higher than the level "8", the wiper operation is stopped. Meanwhile, when the level is equal to or higher than "4" and lower than "8", the operation speed of the wiper is decelerated.

Figure 11:
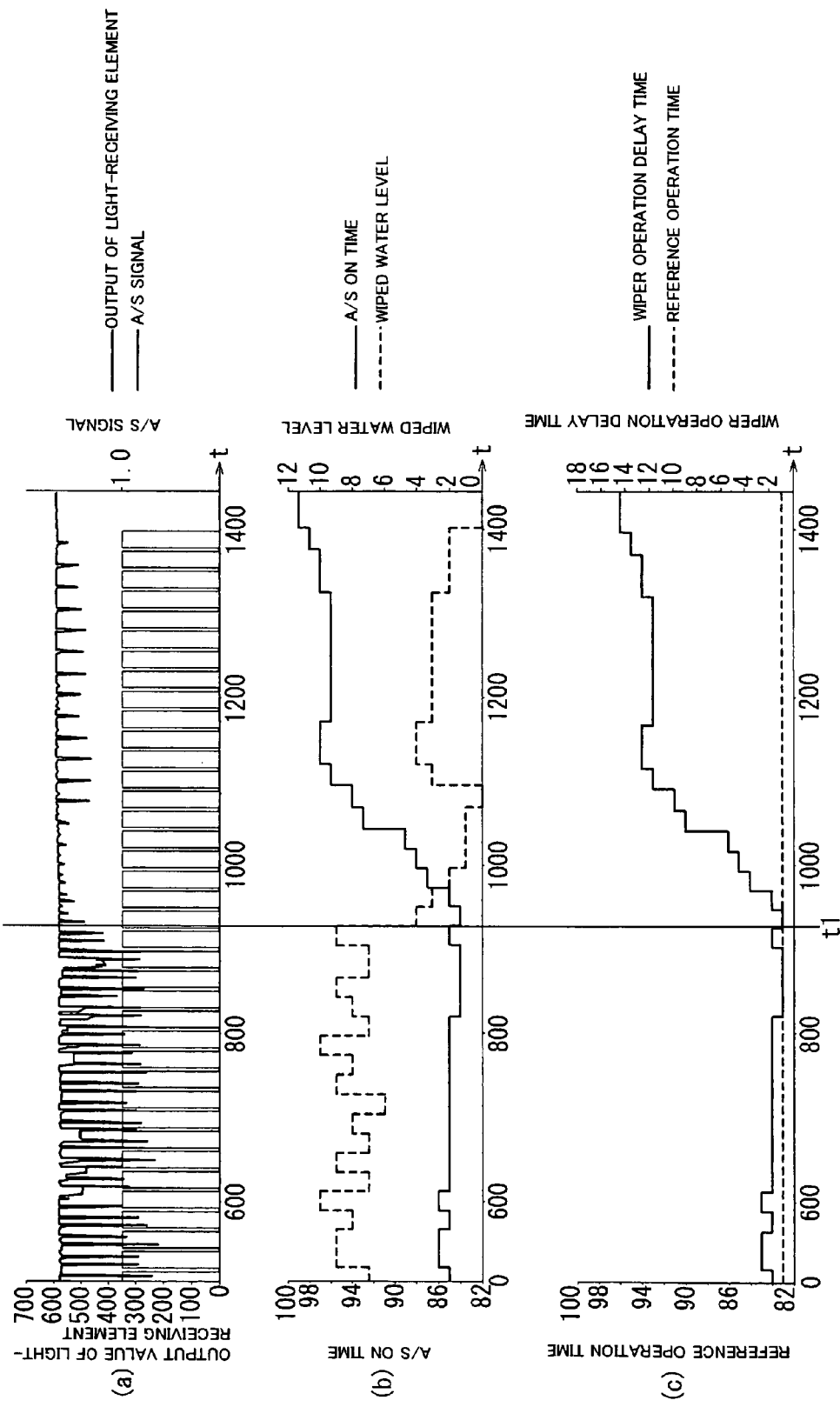
FIG. 11 is an explanatory view showing a relationship between the change in the rainfall state and the change in the wiper operation delay time.

FIG. 11 shows explanatory views with respect to the change in the wiper operation delay time owing to the sharp decrease in the amount of the raindrops adhered onto the windshield glass resulting from abrupt change in the rainfall state. FIG. 11A shows the relationship between the change in the rainfall state, and the change in the output value of the light-receiving element 12 after the digital conversion. FIG. 11B shows the relationship between the wiper operation time (A/S ON time) and the amount of water wiped by the wiper (wiped water level). FIG. 11C shows the relationship between the reference operation time and the wiper operation delay time.

Referring to FIG. 11A, when the rainfall amount sharply decreases owing to the change in the rainfall state during the wiper operation (time point t1), the windshield glass G is getting dried caused by the operation of the wiper for wiping the raindrops away and the decrease in the amount of the rainfall. As a result, friction between the windshield glass G and the wiper is intensified. Referring to FIG. 11B, the wiper operation time (A/S ON time) is increased from the time point t1. Referring to FIG. 11C, the wiper operation delay time is further prolonged. As the amount of the raindrops adhered onto the windshield glass G is reduced from the time point t1, the amount of water wiped by the wiper (wiped water level) is decreased, and water wiped by the wiper is only measured (see FIG. 11B).

The wiper controller 1 according to the embodiment is structured to detect the change in the rainfall state (reduction in the rainfall amount) in response to the wiper operation delay, and to detect the ratio of the change in the rainfall state (rainfall decrease rate) based on the length of the wiper operation delay time. Based on the detected results, it is determined with respect to the need for changing the wiper operation. This makes it possible to accurately detect the change in the rainfall state and to reflect the detected change in the wiper operation control.

When there is no delay in the wiper operation, the amount of the raindrops adhered onto the detection surface D is obtained based on the output value of the light-receiving element 12. The wiper is operated based on the rainfall state estimated from the obtained amount of raindrops.

The wiper controller according to the embodiment which is structured to detect the raindrops adhered onto the windshield glass of the vehicle, and to control the wiper based on the detection result includes the wiped water measurement unit 30 for calculating the amount of water wiped by the wiper, the wiper operation time counter 40 for counting the actual wiper operation time based on the A/S signal of the wiper motor for driving the wiper, the delay time calculation unit 60 for obtaining the wiper operation delay time by comparing the actual wiper operation time with the reference wiper operation time, and the operation change determination unit 70 for determining with respect to the need for changing the wiper operation based on the wiper operation delay time and the amount of water wiped by the wiper.

The wiper operation delay time allows detection of the reduction in the amount of water adhered onto the windshield glass. The delay time level may be used to obtain the reduction level of the water amount further accurately.

When the amount of water adhered onto the windshield glass is reduced, the amount of water wiped by the wiper is decreased. Accordingly, the decrease rate of the amount of water wiped by the wiper and the wiper operation delay time allow the change of the decrease in the amount of water adhered onto the windshield glass to be obtained further accurately.

Based on the wiper operation delay time and the amount of water wiped by the wiper, the change in the amount of water adhered onto the windshield glass resulting from the change in the rainfall state is detected to determine with respect to the need for changing the wiper operation, for example, decelerating the wiper operation speed, or stopping the wiper operation. In this way, as the wiper operation may be adjusted immediately, the driver may be prevented from feeling unpleasant with the wiper operation.

Referring to the determination map which defines the relationship between the wiper operation delay time level and the amount of water wiped by the wiper, when the amount of water wiped by the wiper is smaller than the threshold value defined by the wiper operation delay time, the operation change determination unit 70 determines to stop the wiper operation. The threshold value defined by the wiper operation delay time becomes larger as the wiper operation delay time is prolonged.

Accordingly, as the amount of water adhered onto the windshield glass G is reduced, the longer the wiper operation delay time becomes, the more easily the determination to stop the wiper operation is made. The change in the rainfall state, for example, stop of the rain may be accurately detected so as to be reflected in the wiper control.

The wiper controller is provided with the reference operation time set unit 50 for setting the actual wiper operation time shorter than the currently set reference operation time to the new reference operation time.

The reference operation time is set to the value as the shortest time which reflects the actual wiper operation. This makes it possible to immediately detect the delay in the wiper operation time.

In the embodiment, the optical element for irradiating the light ray to the windshield glass of the vehicle is used to measure the amount of raindrops adhered onto the windshield glass and to estimate the rainfall state. Besides the raindrop sensor using the optical element, any type of the raindrop sensor, for example, using the ultrasonic wave or the one of pressure sensitive type may be employed so long as it is capable of measuring the amount of raindrops and estimating the rainfall state.

In the aforementioned embodiment, when the time delay relative to the reference operation time is equal to or longer than 64 ms (the wiper operation delay level is equal to or higher than "4"), it is determined that the delay occurs in the wiping speed. The wiper stop correction coefficient is then set, based on which the determination is made with respect to the need for changing the wiper operation.

The delay time may be changed to any time other than 64 ms, for example, the one to be set in accordance with the operation mode of the wiper (continual operation or intermittent operation), traveling mode of the vehicle, and the sensitivity volume for the auto-wiper.

In the aforementioned embodiment, the reference operation time is constantly minimized by the reference operation time set unit 50. For example, the average value of N wiper operation times, or the time statistically obtained based on the previous N wiper operation times may be set to the reference operation time.

Plural reference operation time values may be set for each of the operation modes of the wiper so as to select the reference operation time depending on such wiper operation modes as a high-speed continual operation (HIGH continual) mode, a low-speed continual operation (LOW continual) mode, and an intermittent operation mode for determining with respect to the delay in the wiper operation.

Figure 12:
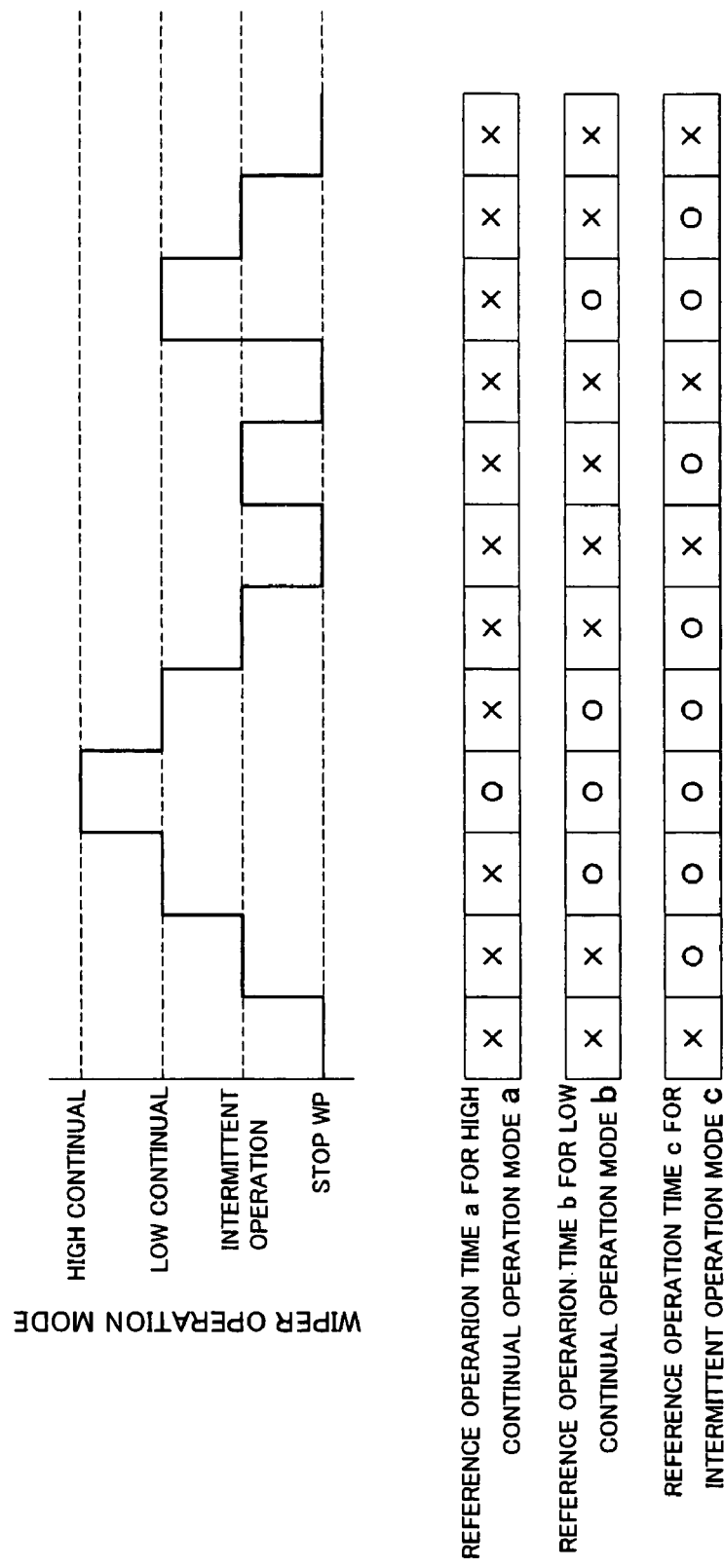
FIG. 12 is a view showing a relationship between switching of the wiper operation mode with time and the reference operation time.

FIG. 12 is a view showing the correlation between the selection of the operation mode of the wiper with time, and the reference operation time effectively set for the respective operation mode. In the drawing, the code "o" represents that the reference operation time is set to be effective, and the code "x" represents that the reference operation time is set to be ineffective.

Referring to the drawing, the effectively set reference operation time is switched corresponding to the selection of the wiper switch (not shown) in the cycle sequentially from stop (WP stop), intermittent operation, LOW continual mode operation, and HIGH continual mode operation. While the wiper switch is selected to the "HIGH continual mode operation", the reference operation time values for the respective operation modes will be effectively set in the order of priority of the reference operation time a for HIGH continual operation mode, the reference operation time b for LOW continual operation mode, and the reference operation time c for the intermittent operation, that is, a>b>c. While the wiper switch is selected to the "intermittent operation", only the reference operation time c for the intermittent operation is effectively set.

As the wiper operation time differs from the wiper operation modes, the reference operation time is selected corresponding to the wiper operation mode so as to allow the determination with respect to the delay in the wiper operation. This makes it possible to detect the delay time more accurately, thus reflecting such delay in the accurate control of the wiper.

In the aforementioned embodiment, the operation change determination unit 70 determines with respect to the need for changing the wiper operation based on the wiper operation delay time and the amount of water wiped by the wiper. The determination with respect to the need for changing the wiper operation may be made based only on the wiper operation delay time.

In the aforementioned case, the change in the rainfall state is derived from the wiper operation delay time. The level of the change in the rainfall state may be obtained by the delay time level. The system may be structured to stop the wiper operation when the wiper operation delay time becomes longer than the predetermined time (300 ms). In this way, the appropriate wiper operation control may be executed in accordance with the delay time.

The wiper operation may be adjusted immediately based on the wiper operation delay time which can be obtained for a short period of time, thus preventing the driver from feeling unpleasant with the wiper operation.

Even in the case where the wiper operation time (wiping time) is gradually retarded owing to the change in the wet state on the surface of the windshield glass resulting from the change in the rainfall state, the wiper operation may be appropriately controlled while accurately detecting the delay time and the delay level.

In the embodiment, the wiper operation time counter 40 counts the wiper operation time based on the A/S signal. The obtained wiper operation time may be corrected in accordance with the battery voltage.

The battery voltage fluctuates in accordance with the load caused by ON/OFF state of the on-board electric components, for example, the air conditioning unit and the power window. The wiper motor at the rotating speed of 42 rpm at the battery voltage of 14V may reduce the rotating speed to 36 rpm when the battery voltage becomes 12V.

The operation time of the wiper motor when the wiper reciprocates in the wiping region is prolonged as the battery voltage is lowered. If the wiper operation time counter 40 obtains the wiper operation time based on the A/S signal without considering the fluctuation in the battery voltage, the wiper may be erroneously determined to have the delay even if no delay occurs in the wiper operation.

When the rotating angle of the wiper motor upon reciprocation of the wiper is 320°, the operation time of the wiper motor at the rotating speed of 42 rpm at the battery voltage of 14V becomes 1.27 s. When the battery voltage drops to 12V, the rotating speed is reduced to 36 rpm, resulting in the operation time of 1.482 s. As a result, the incorrect determination with respect to the delay of 0.212 s may be made.

In the aforementioned case, the wiper correction time (Tk) is derived from the following equation (1). The obtained wiper correction time (Tk) is added to the wiper operation time (T) measured based on the A/S signal such that the wiper operation time (T') having the influence on the fluctuation in the battery voltage eliminated is set as expressed by the following equation (2).

$$Tk = \Delta V \times k, \Delta V = V\text{std} - V\text{ave} \quad (1)$$

$$T' = T + Tk \quad (2)$$

where ΔV denotes the wiper operation voltage difference, k denotes the wiper motor correction coefficient, Vstd denotes the reference voltage, and Vave denotes the average battery voltage during the wiper operation (the duration while the A/S signal is kept ON).

The wiper motor correction coefficient (k) denotes the relationship between the voltage and the rotating speed of the wiper motor, which is defined by the feature of the wiper motor.

Assuming that the wiper operation time difference is obtained when the wiper is reciprocated by the wiper motor at different voltages of 14V at which the wiper motor is operated at 42 rpm, and 12V at which the wiper motor is operated at 36 rpm, the wiper correction coefficient (k) is derived from the following equation:

wiper correction coefficient (k)=121 ms/(14−12)
V=106 ms/V

Figure 13:
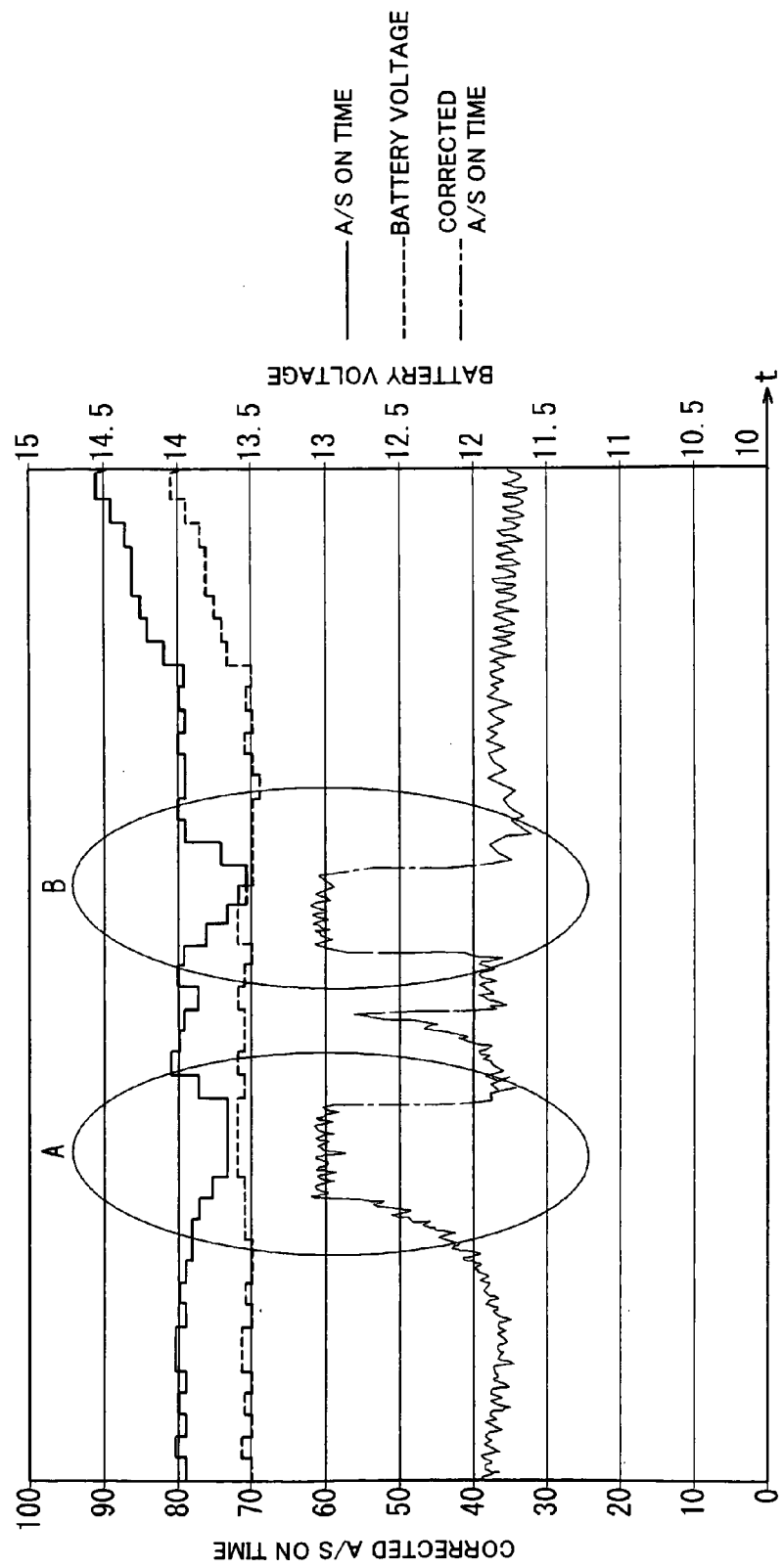
FIG. 13 is a timing chart showing a relationship between fluctuation in the battery voltage and the corrected wiper operation time.

FIG. 13 is a timing chart showing the relationship among the fluctuation in the battery voltage, the wiper operation time (A/S ON time), and the corrected wiper operation time (corrected A/S ON time).

Referring to the drawing, in each of the encircled oval regions A and B, the battery voltage largely fluctuates. In this case, if the counted wiper operation time is not corrected in the wiper operation time counter 40 in accordance with the battery voltage, the wiper operation time largely fluctuates due to the fluctuation of the battery voltage.

Meanwhile, when the wiper operation time is corrected, no fluctuation is observed in the wiper operation time.

Elimination of the influence of the battery voltage allows the wiper operation delay time to be detected, and the level of the delay time to be specified accurately, thus enabling the accurate wiper control in response to the rainfall state.

What is claimed is:

1. A wiper controller which detects raindrops adhered onto a windshield glass of a vehicle to control a wiper based on a detection result, comprising:
    a wiper operation time counter for counting an actual operation time of the wiper based on an ON/OFF signal of a wiper motor for driving the wiper;
    a delay time calculation unit for obtaining a delay time of the wiper by a comparison between a reference wiper operation time and the actual operation time; and
    an operation change determination unit for determining with respect to a need for changing the wiper operation based on the delay time of the wiper.

2. The wiper controller according to claim 1, further comprising a wiped water measurement unit for measuring an amount of water wiped by the wiper, wherein the operation change determination unit determines with respect to the need for changing the wiper operation based on the delay time of the wiper and the amount of water wiped by the wiper.

3. The wiper controller according to claim 2, wherein:
    the operation change determination unit determines to stop the wiper operation when the amount of water wiped by the wiper is smaller than a threshold value defined by the delay time of the wiper; and
    the threshold value is set to be large as the delay time of the wiper is prolonged.

4. The wiper controller according to claim 2, further comprising a reference operation time set unit for setting the reference operation time, wherein the reference operation time set unit sets the actual operation time of the wiper which is shorter than a currently set value of the reference operation time to a new value of the reference operation time.

5. The wiper controller according to claim 2, wherein the wiper operation time counter corrects the actual operation time of the wiper based on a battery voltage for driving the wiper motor.

6. The wiper controller according to claim 2, wherein the reference operation time is set for each operation mode of the wiper.

7. The wiper controller according to claim 1, further comprising a reference operation time set unit for setting the reference operation time, wherein the reference operation time set unit sets the actual operation time of the wiper which is shorter than a currently set value of the reference operation time to a new value of the reference operation time.

8. The wiper controller according to claim 7, wherein the wiper operation time counter corrects the actual operation time of the wiper based on a battery voltage for driving the wiper motor.

9. The wiper controller according to claim 7, wherein the reference operation time is set for each operation mode of the wiper.

10. The wiper controller according to claim 1, wherein the wiper operation time counter corrects the actual operation time of the wiper based on a battery voltage for driving the wiper motor.

11. The wiper controller according to claim 10, wherein the reference operation time is set for each operation mode of the wiper.

12. The wiper controller according to claim 1, wherein the reference operation time is set for each operation mode of the wiper.

13. The wiper controller according to claim 1, wherein the operation change determination unit determines to stop the wiper operation when the delay time of the wiper becomes longer than a predetermined threshold value.

* * * * *